2,914,585
Patented Nov. 24, 1959

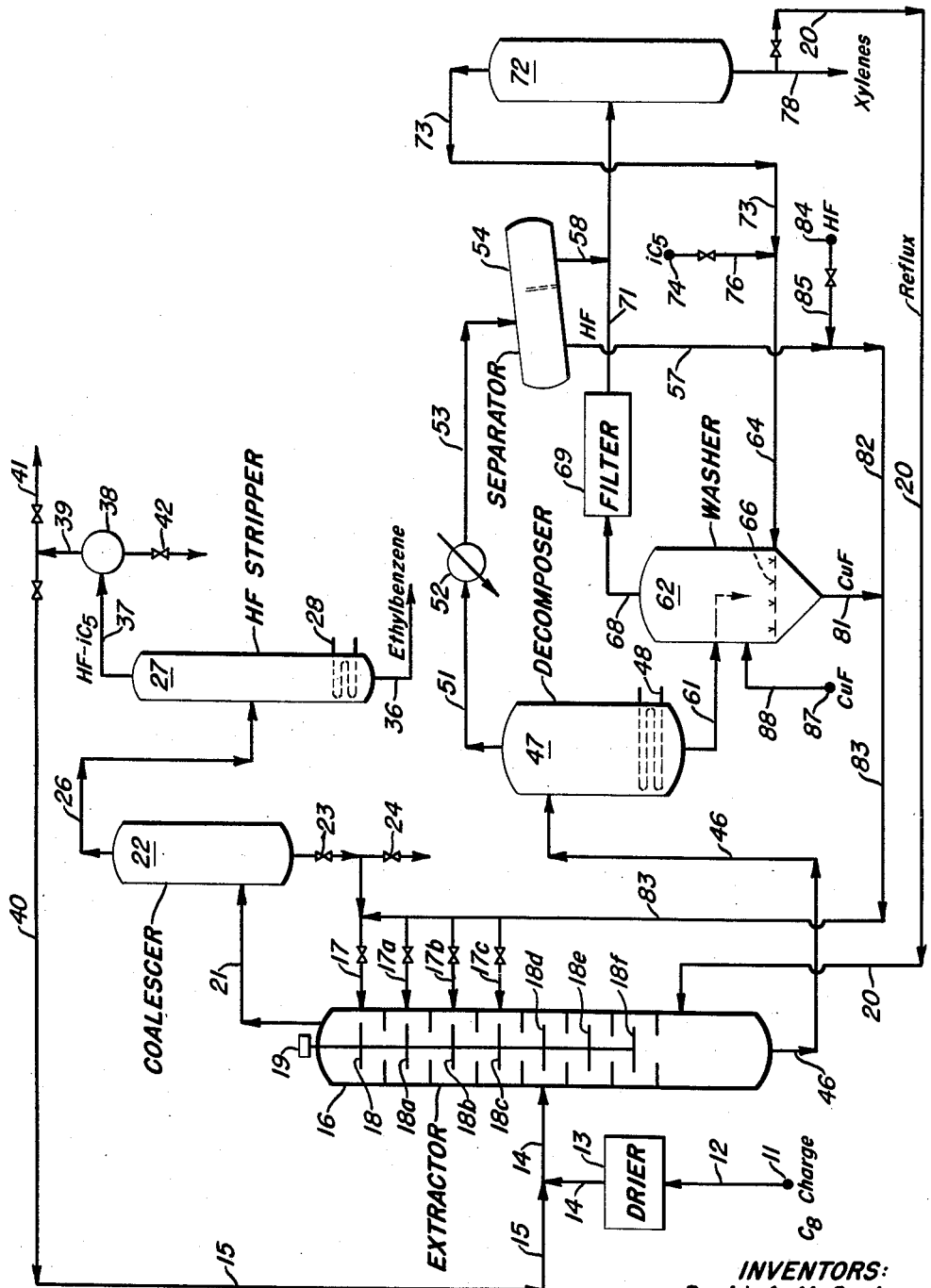

2,914,585

XYLENE-ETHYLBENZENE SEPARATION USING HYDROGEN FLUORIDE AND COPPER FLUORIDE

David A. McCaulay, Homewood, Ill., and Arthur P. Lien, Highland, Ind., assignors to Standard Oil Company, Chicago, Ill., a corporation of Indiana Application September 8, 1958, Serial No. 759,514

10 Claims. (Cl. 260—674)

This invention relates to the separation of ethylbenzene and xylene by treatment with an extractive agent.

Considerable demand exists for ethylbenzene as a source of styrene. Large quantities of ethylbenzene are present in naphthas derived from petroleum refining operations. Unfortunately, this ethylbenzene is present in admixture with the three xylene isomers. The boiling point difference between ethylbenzene and the close-boiling xylenes, namely para-xylene and meta-xylene, is such that separation by even superfractional distillation is impractical. The relative volatility or separation factor between ethylbenzene and para-xylene is only 1.05.

Arthur P. Lien and David A. McCaulay show, in U.S. 2,739,992, that xylene can be extracted away from ethylbenzene by the use of a liquid HF-AgF agent. When utilizing this agent, the single stage separation factor is 1.36. Although this is a very great improvement over the effectiveness of fractional distillation alone, the cost of silver, taken in connection with this small separation factor, makes the liquid HF-AgF process rather expensive.

An object of the invention is the separation of a mixture of ethylbenzene and at least one xylene into fractions which are richer with respect to ethylbenzene than the feed mixture and richer with respect to xylene than the feed mixture, respectively. Another object is a process for separating a mixture of ethylbenzene and xylene into a high purity ethylbenzene fraction and a high purity xylene fraction, i.e., containing on the order of 90 mole percent or more of the desired aromatic hydrocarbon. Still another object of the invention is a process for separating ethylbenzene from admixture with xylene wherein a high purity ethylbenzene product fraction and a high purity xylene product fraction are obtained. Other objects of the invention will become apparent in the course of the detailed description.

It has been discovered that a copper fluoride in combination with liquid hydrogen fluoride preferentially complexes with the xylene isomers in a mixture containing ethylbenzene and, at least one, xylene isomer(s). By the use of this liquid HF and copper fluoride combination agent, the single stage separation factor for separating xylene from ethylbenzene is about 2.7. In the correlation made by Colburn and Schoenborn in Trans. Amer. Inst. Chem. Engrs., 41 421–443, 645 (1945), the difficulty of separation of two liquids is measured by relative volatility, for vapor-liquid systems, and relative distribution ratio, for liquid-liquid systems.

$$\alpha = \frac{y_1/y_2}{x_1/x_2}$$

where $\alpha$ = relative volatility or relative distribution ratio, $y_1$ and $y_2$ = mol fraction of the two components in one phase, and $x_1$ and $x_2$ = mol fraction of the two components in the other phase. Colburn gives an approximate method of calculating the number of theoretical stages needed to obtain 99% purity fractions at a practical reflux ratio, $$N_p = 18.4/\alpha - 1$$

Utilizing this correlation, an ethylbenzene fraction containing 99 mole percent of ethylbenzene and a xylene fraction containing 99% of xylene is obtainable in an extraction operation providing about 12 theoretical separation stages. (This is in marked contrast with the HF-AgF system which requires about 50 stages.) A product containing at least about 95% of ethylbenzene is obtainable by utilizing about six theoretical separation stages.

In our copending application entitled, "Aromatic Recovery Using Hydrogen Fluoride and Copper Fluoride," Serial No. 743,557, filed June 23, 1958, as a continuation-in-part of Serial No. 572,948, filed March 21, 1956, now abandoned, it is disclosed and claimed that copper fluorides in combination with liquid hydrogen fluoride form complexes with all aromatic hydrocarbons, which complexes are very soluble in liquid HF. It appears that cuprous fluoride forms a complex containing 2 moles of aromatic hydrocarbon for each mole of cuprous fluoride present. Cupric fluoride apparently forms a complex containing 1 mole of aromatic hydrocarbon for each mole of cupric fluoride present therein. This molar relationship applies equally to ethylbenzene and the individual xylene isomers. (HF must also be present in the complex, because no complex is formed in the absence of liquid HF.)

It appears that there is no significant difference between the stability of the complex formed by the individual xylene isomers, i.e., the separation factor between the various xylene isomers is very close to 1. However, there is a marked difference in the stability of the ethylbenzene-copper fluoride complex as against that of the copper fluoride-xylene complex. (It is to be understood that whenever the complex is referred to herein, it is considered to contain HF as well as aromatic hydrocarbon and copper fluoride, even though no mention is made of the HF.) When a mixture of ethylbenzene and at least one xylene isomer is contacted with liquid HF and copper fluoride in an amount less than that theoretically needed to complex all the $C_8$ aromatic hydrocarbon present, in the presence of an essentially parafinic hydrocarbon, the uncomplexed aromatics pass into the raffinate phase. The raffinate phase in a single stage system contains both ethylbenzene and xylene; however, the ratio of ethylbene to xylene in the raffinate phase is higher than the ratio of ethylbenzene to xylene existing in the feed mixture charged to the contacting zone. The acid phase contains liquid HF, the copper fluoride, ethylbenzene and xylene; the ratio of ethylbenzene to xylene in the acid phase is less than the ratio of ethylbenzene to xylene present in the feed mixture to the contacting zone.

In order to obtain product fractions having composition differences of some appreciable value, there is used as least about 0.1 mole of cuprous fluoride per mole of xylene in the feed mixture, or about 0.2 mole of cupric fluoride per mole of xylene in the feed mixture. For maximum recovery of xylene and ethylbenzene as separate product fractions, it is preferred to use about the theoretical amounts of copper fluoride needed to extract all the xylene present in the feed; or, as closely as is possible, the theoretical amount itself. Under some conditions, it may be desirable to use more than the theoretical amount in order to increase the purity of the ethylbenzene fraction in a given contacting zone. No worthwhile technical reason appears for using more than about 0.6 mole of cuprous fluoride or 1.2 mole of cupric fluoride per mole of xylene present in the feed. It is preferred to use a multi-stage operation utilizing about the theoretical amount of copper fluoride needed to extract the xylene from the feed mixture.

In order to obtain very high purity product fractions containing on the order of 95% or more of the desired aromatic hydrocarbon, it is desirable to operate a multi-stage contacting zone with a zylene reflux. In general between about 0.1 and 1 mole of xylene reflux is used per mole of ethylbenzene in the feed mixture. More or less than this amount may be used, dependent upon the particular operating conditions and the contacting zone itself. When operating with xylene reflux, it is necessary to introduce into the contacting zone not only the copper fluoride needed for the extraction of the xylene component of the feed mixture, but also the theoretical amount of copper fluoride needed to complex with the xylene reflux.

It is necessary that the copper fluoride used be in the anhydrous form. The cupric fluoride dihydrate available commercially does not form a complex with aromatic hydrocarbons in the presence of liquid HF.

The presence of water has a deleterious effect on the extraction efficiency of the liquid HF-copper fluoride extracting agent. The process is carried out under essentially anhydrous conditions. The liquid hydrogen fluoride utilized in the process should be anhydrous or essentially so. The commercial grade anhydrous hydrofluoric acid which contains on the order of 1–2 weight percent of water is suitable for use in the process.

Some aromatic hydrocarbons can be extracted from a feed mixture by the use of copper fluoride in combination with just enough liquid HF to form a distinct separate acid phase. The extraction efficiency of the agent, as measured by the moles of aromatic hydrocarbon extracted per mole of copper fluoride present, increases rapidly as the amounts of liquid HF present is increased, up to about 3 moles of HF per mole of aromatic hydrocarbon in the feed mixture. More than this amount is helpful in phase separation and in improving the contacting. It is preferred to operate with between about 6 and 30 moles of HF per mole of aromatic hydrocarbon in the feed. It is to be understood that more than this amount of HF may be used. Large amounts of HF are particularly helpful when operating at low temperature. Put in another way, the liquid HF usage may be between about 30 and 150 volume percent, based on the total feed mixture.

The copper fluoride may be introduced into the contacting zone either in the form of a solid powder or as a slurry in the liquid HF or even as a dispersion in the feed mixture. Or the solid powder may be introduced into the HF acid phase present in the contacting vessel. It is preferred to introduce the copper fluoride as a dispersion in the liquid HF portion of the agent.

The feed to the extraction process of the invention contains ethylbenzene and at least one xylene as essentially the only aromatic hydrocarbons therein. The presence of small amounts of $C_9$ aromatic hydrocarbons, such as may be present in the commercial $C_8$ aromatic hydrocarbon mixtures, is tolerable. The process may be operated on a mixture of ethylbenzene and xlyene which is free or essentially free of non-aromatic hydrocarbons. However, the separation efficiency in liquid-liquid operation is adversely effected since non-complexed aromatic hydrocarbons are taken in large amounts into the acid phase. The mixtures which are obtained by distillation from petroleum naphthas may be utilized where the presence of close boiling non-aromatic hydrocarbons along with the ethylbenzene is not a drawback to the subsequent use of the ethylbenzene.

When it is desired to have aromatic product fractions which are essentially free of other hydrocarbons, it is preferred to operate with a mixture of ethylbenzene, xlyene and paraffinic hydrocarbon having a boiling point or range such that the paraffinic hydrocarbon is readily separable from the aromatic hydrocarbon by distillation, either simple distillation or fractional distillation. The paraffinic hydrocarbon may either be a low boiling hydrocarbon such as isopentane, hexane, or it may be a high boiling hydrocarbon boiling well above the boiling point of, for example, ortho-xylene.

The feed mixture should be essentially free of olefinic hydrocarbons and organo-sulfur compounds. Liquid HF, under these conditions, catalyzes the alkylation of the aromatic hydrocarbons with olefinic hydrocarbons, thereby decreasing the yield of the desired $C_8$ aromatic hydrocarbons. Organo-sulfur compounds form complexes with the copper fluorides which are much more stable than are the aromatic hydrocarbon-copper fluoride complexes. The absence of organo-sulfur compounds simplifies the recovery of all the copper fluoride charged to the contacting zone.

The ethylbenzene-xylene mixture may be derived from any source. Coal tar and $C_8$ aromatic hydrocarbons are suitable. Close-boiling mixtures obtained by superfractional distillation from petroleum naphthas or the very low non-aromatic content fractions obtained by extractive distillation may be used when the presence of some close-boiling non-aromatic hydrocarbon is tolerable in the aromatic product fractions. There are available mixtures of ethylbenzene and all three xylene isomers or mixtures of ethylbenzene and xlyenes low in ortho-xylene content, which mixtures contain no, or virtually no non-aromatic hydrocarbons and organo-sulfur compounds. These mixtures are obtained, in the first instance, by glycolic extraction of petroleum naphtha or liquid HF–AgF extraction, or liquid HF-copper fluoride extraction under conditions to displace the close-boiling non-aromatic hydrocarbons with, preferably, a low boiling paraffin.

The contacting is carried out at a temperature below that resulting in appreciable formation of side-reaction products, namely, cracking of paraffinic hydrocarbons; cracking and/or disproportionation of the aromatic hydrocarbons. In the case of aromatic hydrocarbons, the maximum temperature is about 150° C. In the case of paraffinic hydrocarbons, the maximum temperature appears to be about 80° C. The process is usable at temperatures well below normal, for example, −20° C. The liquid-liquid separation process operates very effectively at ambient temperatures and for this reason it is preferred to operate this process at temperatures between about 10° C. and 35° C.

As the contacting step involves complex-formation between solid copper fluoride, aromatic hydrocarbons, and probably some liquid HF, maximum extraction efficiency requires that the contacting be carried on for a sufficient time. The degree of agitation appears to be the controlling factor in the attainment of maximum yields. With efficient agitation, contacting times on the order of 5 minutes are sufficient. With inefficient agitation, times as much as 1 hour or more may be needed.

It is to be understood that the contacting operation requires the presence of liquid hydrogen fluoride. Therefore, the contacting zone must be maintained at a pressure sufficiently high to keep the HF in the liquid state.

Aromatic hydrocarbons pass into the liquid HF acid phase so that the acid phase contains liquid HF and an HF-soluble complex containing copper fluoride and aromatic hydrocarbons. In addition to these, the acid phase contains physically dissolved aromatic and non-aromatic hydrocarbons. (Also, the acid phase may contain organo-sulfur compounds which have reacted with copper fluoride to form an HF-soluble complex.) The aromatic hydrocarbons may be readily recovered by distilling the HF away from the acid phase. The complex appears to decompose readily at moderate temperatures. By the time all the HF has been distilled away from the acid phase, there will remain precipitated solid copper fluoride and, possibly, some aromatic hydrocarbons. In the case of the lower boiling aromatic hydrocarbons, all or substantially all of the aromatic hydrocarbons will also distill overhead. (The complex of organo sulfur compounds and copper fluoride is much more stable than the complex of aromatic hydrocarbon and copper fluoride. This complex may still be present in the distillation zone after HF has ceased to distill over. For example, an acid phase containing HF, diethyl sulfide, and cuprous fluoride had to be heated to 400° C. at atmospheric pressure for some hours before all the HF had been distilled over and the cuprous fluoride recovered completely as such.)

In general, the distillative removal of the HF is carried out at temperatures between about 20° C. and 125° C. Pressure has an important bearing on the temperature which is needed to be used. At the lower temperatures, it is necessary to operate with a vacuum on the system. Thus, at 20° C. it is desirable to operate with a pressure of about 1 mm. Hg. As the temperature is increased, more pressure is tolerable on the distillation zone and at about 125° C. it is possible to operate with a pressure of about 1 atmosphere or even slightly more. Thus there is a relationship between the temperature and pressure which may be set out as the lower the temperature the lower the pressure needed, or the lower pressures correspond to the lower temperatures. The distillation is continued at least for that time needed to remove all the HF present (disregarding the amount present in complex with organo sulfur compounds), leaving in the distillation zone residue of solid copper fluoride and extract hydrocarbons. Or, the distillation may be continued until all of the extract hydrocarbons have been distilled away from the distillation vessel leaving solid copper fluoride remaining therein.

When extract hydrocarbons and solid copper fluoride have been left in the distillation zone, the solid copper fluoride may be readily filtered away from the liquid hydrocarbons.

In the laboratory, the extract hydrocarbons may be readily separated from the acid phase by diluting the acid phase with cold water or aqueous caustic solution. The extract forms an upper hydrocarbon phase above a lower aqueous phase. The extract may be then neutralized prior to further processing, such as distillation into close boiling fractions or even high purity aromatic hydrocarbons. In a one-step laboratory contacting on a feed containing as much as 60% aromatic hydrocarbon the extract will contain on the order of 94–95% of aromatic hydrocarbons.

Further, it has been discovered that a fraction enriched in ethylbenzene can be separated from an ethylbenzene-xylene feed using liquid hydrogen fluoride-copper fluoride agent by using a technique hereinafter designated as liquid-vapor technique. In the liquid-vapor technique, ethylbenzene-xylene feed is contacted with liquid hydrogen fluoride and an amount of copper fluoride not more than about that needed to complex all the xylene present in the feed. After the complex has been formed, temperature and pressure conditions are adjusted to permit removal of HF vapors and hydrocarbon vapors from the contacting zone. Additional liquid HF may be introduced into the vaporization zone in order to maintain the presence of a liquid HF phase and to provide additional HF for assisting in taking overhead hydrocarbon vapor. There is taken overhead, in addition to non-aromatic hydrocarbons which may be present in the feed, an ethylbenzene-xylene fraction which is enriched with respect to the feed in ethylbenzene content and derived from non-complexed aromatic hydrocarbons present.

The temperature of the liquid HF phase, during the vaporization step, is determined in the lower region by the need to obtain an appreciable vaporization rate and is limited in the upper region by appearance of side-reactions such as cracking of paraffin hydrocarbons and/or disproportionation reactions of the aromatic hydrocarbons. When the ethylbenzene-xylene feed contains paraffinic hydrocarbons, the vaporization zone should be maintained at a maximum temperature on the order of 80° C.; in general, with this feed the vaporization zone temperature will fall within the range of about 50–80° C.

The liquid-vapor technique is particularly suitable when it is desired to operate on an ethylbenzene-xylene feed which contains no non-aromatic hydrocarbons. Using a feed consisting only of ethylbenzene and xylene, the vaporization zone may be operated at temperatures as high as 150° C.; however, in order to avoid side-reactions, it is preferred to operate at temperatures on the order of 100–120° C.

Extremely high purity ethylbenzene can be obtained by the liquid-vapor technique by using a number of batch complexing and vaporization stages operating in series on the overhead from the preceding stage. Or, more efficiently, a distillation tower operation may be utilized wherein an ethylbenzene-xylene feed is introduced into a tower under conditions such that liquid HF is present on all the distillation plates; copper fluoride and liquid HF are introduced at various points in the tower above the point of feed entry in order to permit the sequential enrichment operation as the ethylbenzene-xylene vapors pass from one distillation plate to the next above. In such an operation, it is possible, in a tower of reasonable size, to obtain essentially pure ethylbenzene overhead and a liquid HF phase bottoms containing essentially only xylene in the form of a complex with copper fluoride.

The results obtainable with the process of the invention are set out in the following illustrative examples, which are not to be considered as limiting the scope of the invention.

The runs were carried out in a Hastelloy autoclave provided with a mechanical stirrer. Anhydrous finely divided cuprous fluoride and commercial grade anhydrous hydrofluoric acid, which contained about 1 weight percent of water, were introduced into the autoclave. The particular feed mixture was then added. In Runs 1–4, the contents of the autoclave were stirred for 1 hour at about 20° C. At the end of this time, the contents were permitted to settle for 10 minutes. The lower acid phase was withdrawn into a polyethylene bucket containing crushed ice; the upper layer of extract hydrocarbons was decanted from the lower aqueous layer. The raffinate layer from the autoclave was withdrawn. The extract hydrocarbons and the raffinate hydrocarbons were neutralized and water-washed separately before being fractionated in a laboratory column providing about 30 theoretical plates. The close-boiling fractions from each distillation were analyzed by physical characteristics and also by ultraviolet and/or infrared spectrometry.

The results of these runs are set out in the table. In Run No. 1, the feed consisted of meta-xylene, para-xylene, both cp. quality, and n-heptane. The single stage separation factor was calculated according to the method of Colburn and Schoenborn.

Run No. 2 was carried out on a feed mixture containing about equimolar quantities of meta-xylene and ethylbenzene. The single stage separation factor in this run was 2.7. Run No. 3 was carried out on a meta-xylene-ethylbenzene distribution more typical of a natural mixture. The separation factor in Run No. 3 was 2.6.

In Runs 1 and 2, where a good separation was obtained between the acid phase and the raffinate phase, the total extract hydrocarbons contained 94% of aromatic hydrocarbons in a single stage operation. The ethylbenzene and xylenes were readily separable from the n-heptane by the fractional distillation.

Runs 1 and 4 show that there is no significant difference in complex stability between complexes of the three xylene isomers.

TABLE

| Run No. | 1 | 2 | 3 | 4 |
|---|---|---|---|---|
| CuF, g | 7 | 10 | 10 | 29. |
| HF, g | 60 | 75 | 75 | 60. |
| Temperature, °C | 20 | 20 | 20 | 20. |
| Feed, Composition: | | | | |
| Aromatic A, type | m-xylene | m-xylene | m-xylene | o-xylene. |
| Aromatic B, type | p-xylene | Ethylbenzene | Ethylbenzene | p-xylene. |
| Aromatic A, Vol. Percent | 17 | 20 | 30 | 34. |
| Aromatic B, Vol. Percent | 17 | 20 | 10 | 34. |
| n-Heptane, Vol. Percent | 66 | 60 | 60 | 32. |
| Feed, ml | 108 | 125 | 125 | 190. |
| CuF/Ar., mole ratio | 0.3 | 0.3 | 0.3 | 0.3. |
| HF/Feed, Vol. Percent | 55 | 60 | 60 | 32. |
| Raffinate, A/B mole ratio | 0.86 | 0.55 | 1.8 | 1.15. |
| Extract, A/B mole ratio | 0.96 | 1.48 | 4.6 | .88. |
| Separation Factor, Single Stage | 1.1 | 2.7 | 2.6 | 1.3. |
| CuF/Arom. Ext., mole ratio | 1.7 | 1.9 | | |
| Extract, Vol. Percent Arom | 94 | 94 | | |

Note.—Within the error of analytical procedures, no ethylbenzene was disproportionated or xylene disproportionated or isomerized.

Run No. 5

This run was carried out in the apparatus described for Runs 1–4. In this run, 0.12 mole of cuprous fluoride, 0.19 mole of ethylbenzene, 0.28 mole of m-xylene and 100 ml. of liquid hydrofluoric acid were charged to the reactor. The contents were stirred for about two hours at 25° C. The temperature of the reactor was raised to 74° C. and some of the HF and hydrocarbon were removed as vapors; these were condensed and the hydrocarbons separated. Additional liquid HF, to the amount of about 360 ml. was added periodically to the reactor and additional HF and hydrocarbon vapors taken overhead.

The hydrocarbons recovered from the overhead stream and from the liquid HF phase remaining in the reactor were analyzed for ethylbenzene and m-xylene content. The overhead hydrocarbon fraction contained 48% of ethylbenzene and 52% of p-xylene; this compares with the 40:60 composition of the feed. The bottoms hydrocarbon fraction contained 26% of ethylbenzene and 72% of p-xylene. The separation factor calculated for this single stage liquid-vapor operation was 2.6.

The annexed figure, which forms a part of this specification, shows one illustrative embodiment of the use of cuprous fluoride and liquid HF for the separation of an ethylbenzene-xylene mixture. It is to be understood that this embodiment is schematic in nature and many items of equipment have been deliberately omitted as these may be added by those skilled in this art.

In this embodiment, the $C_8$ charge has been derived from a catalytic reformate and is nitration grade material. The $C_8$ charge contains about 20 mole percent of ethylbenzene and the remainder a mixture of the three xylene isomers.

$C_8$ charge from source 11 is passed by way of line 12 through drier 13. In drier 13, the water contained in the feed is removed essentially completely. Drier 13 may consist of a well-known alumina drier followed by chemical drying through lime to remove last traces of water. Any of the well-known techniques for removing dissolved water from hydrocarbons may be used herein. The dried charge is passed from drier 13 by way of line 14 into extractor 16 at a lower point thereof.

Isopentane from line 15 is introduced into line 14 and is thoroughly intermingled with the charge from drier 13. Sufficient isopentane is introduced so that the feed entering extractor 16 contains about equal volume of isopentane and aromatic hydrocarbons. It is to be understood that any paraffinic hydrocarbon which can be readily separable from the ethylbenzene or xylene by fractional distillation may be utilized instead of the isopentane.

Extractor 16 is a vessel adapted for the continuous countercurrent contacting of two immiscible liquids. Instead of using a countercurrent tower, a number of individual stages providing countercurrent flow may be used. Extractor 16, in this embodiment, provides eight theoretical separation stages.

Agent is passed into extractor 16 at various points through valved lines 17, 17a, 17b, and 17c. Extractor 16 is divided into contacting zones as shown. Each of these contacting zones is agitated by means of a turbine-type stirrer 18—18f. The stirrers are driven by motor 19.

The agent utilized herein contains commercial grade anhydrous hydrofluoric acid in an amount corresponding to 55 volume percent, based on feed from line 14. Solid cuprous fluoride is present to the extent of 0.5 mole per mole of xylene in the feed from line 14. The agent is in effect a slurry of solid cuprous fluoride in the liquid HF.

A xylene reflux is introduced into the lower part of extractor 16 by way of line 20. In this embodiment, 0.5 mole of xylene are introduced per mole of ethylbenzene in the feed from line 14. 0.5 mole of cuprous fluoride are introduced into extractor 16 by way of lines 18, etc. per mole of xylene introduced as reflux by way of line 20.

In this embodiment, extractor 16 is operated at a constant temperature, over its entire height, of 20° C. and at a pressure of 10 p.s.i.g. in order to keep the HF in the liquid state. Sufficient contacting time is provided so that essentially all the xylene is extracted by the agent as the feed flows up extractor 16.

From the top of extractor 16, there is withdrawn by way of line 21 a raffinate phase which contains a small amount of occluded agent. The raffinate phase is passed into coalescer 22, wherein the occluded agent is separated. The recovered agent is withdrawn from coalescer 22 by way of valved line 23 and may be recycled to line 18 for reuse in the process or withdrawn from the system by way of valved line 24. Coalescer 22 may be any vessel adapted to facilitate separation of dispersed immiscible liquid from another liquid, for example, coalescer 22 may be filled with steel wool. From coalescer 22, the raffinate is passed by way of line 26 into HF stripper 27 which is provided with internal heat exchanger coils 28.

Stripper 27 is operated to remove overhead the dissolved HF and isopentane. From the bottom of stripper 27, there is removed by way of line 36 an ethylbenzene product fraction containing about 97% of ethylbenzene and the remainder xylenes.

The HF and isopentane vapors are removed overhead from stripper 27 by way of line 37 and are condensed in cooler 38 which also functions as a liquid-liquid separator. Separate vessels may be used for this operation. Isopentane is removed from cooler 38 by way of line 39 and may be recycled by way of valved line 40 and line 15 to line 14. Or, the isopentane may be withdrawn from the system by way of valved line 41. The liquid HF is withdrawn from cooler 38 by way of valved line 42 and may be recycled for reuse by lines not shown.

An extract phase, i.e., liquid HF acid phase, consisting of liquid HF, cuprous fluoride-aromatic hydrocarbon complex and dissolved isopentane is withdrawn from extractor 16 and passed by way of line 46 into decomposer 47 which is provided with an internal heater 48. In this embodiment, decomposer 47 is operated at a temperature of 30° C., at a pressure of about 10 mm. Hg for a time of about 1 hour.

Under these conditions, HF, some aromatic hydrocarbons, and isopentane pass overhead through line 51. These vapors are condensed in cooler 52 and pass by way of line 53 into separator 54. Separator 54 is adapted for the gravity separation of two immiscible liquids. A lower phase of liquid HF is withdrawn from separator 54 by way of line 57. An upper phase of aromatic hydrocarbons and isopentane is withdrawn from separator 54 by way of line 58.

From the bottom of decomposer 47, a slurry consisting of aromatic hydrocarbons and solid CuF is passed by way of line 61 into washer 62. Washer 62 is a vessel adapted for fluidized contacting of an immiscible liquid-solid with a wash liquid. In this instance, isopentane from line 64 is introduced into washer 62 by way of distributor 66. The amount of isopentane introduced into washer 62 is sufficient to dissolve all the decomplexed aromatic hydrocarbon and remove adsorbed aromatic hydrocarbon from the surface of solid CuF. The amount of low boiling paraffinic hydrocarbon used in washer 62, in general, is between about 0.25 and 1 volume of low boiling paraffin hydrocarbon such as isopentane per volume of slurry charged to washer 62 by way of line 61. Herein 0.5 volume of isopentane are introduced by way of line 64 per volume of slurry in line 61. Washer 62 is operated at about ambient temperature and pressure.

A liquid stream of isopentane and aromatic hydrocarbons is withdrawn from the top of washer 62 and is passed by way of line 68 into filter 69. Filter 69 is adapted to remove solid CuF which has been entrained by the emerging stream. Preferably, two filters are used in parallel so that one filter may be cleaned to recover CuF without interrupting the continuous operation. The filtered material is passed by way of line 71 into fractionator 72. The hydrocarbons from line 58 are passed by way of line 71 into fractionator 72. Fractionator 72 is shown schematically. There is taken overhead isopentane vapors and these are passed by way of line 73 and line 64 back to washer 62. Makeup isopentane from source 74 is passed by way of valved line 76 into line 64.

A xylene product stream is withdrawn from fractionation zone 72 by way of line 78. This stream contains about 97% of xylenes and the remainder ethylbenzene. A portion of this stream is withdrawn by way of line 20 and is passed to extractor 16 for use as reflux.

A slurry of CuF in isopentane is withdrawn from washer 62 by way of line 81. Liquid HF from line 57 is passed by way of line 82 through an eductor not shown to pick up the slurry from line 81. The slurry of CuF, isopentane and liquid HF is passed by way of line 83 back to manifolded line 18 for release in extractor 16.

Makeup liquid HF in the form of commercial grade anhydrous hydrofluoric acid is introduced from source 84 by way of valved line 85 into line 57. Makeup cuprous fluoride is introduced from source 87 by way of line 88 into washer 62.

Instead of using the procedure set out in the illustrative embodiment, a batch system may be used wherein the contacting is carried out in one vessel, the raffinate phase separated and treated to remove dissolved HF and occluded agent. The acid phase remaining in the contacting vessel is then decomposed by heating at suitable conditions to remove overhead not only the HF but also the hydrocarbons. The HF and hydrocarbons are separated and processed as shown in the illustrative embodiment. The solid copper fluoride remains in the contacting vessel and is ready for extraction of another batch of mixed feed. By the use of two or more contacting vessels, it is possible to carry out a continuous operation with respect to all parts of the system except the contacting vessels themselves.

The above illustrative embodiment is particularly suitable for an operator who does not have a source of $C_8$ aromatic hydrocarbons in admixture with close-boiling non-aromatic hydrocarbons and is dependent upon commercial production for his charge. In the case of a petroleum refiner who has either virgin naphtha containing readily recoverable amounts of ethylbenzene-xylene boiling range mixed hydrocarbons or catalytic reformate, a combination process is more suitable. Thus when a catalytic reformate is available this may be readily fractionated into a $C_8$ boiling range out containing about 50% aromatic hydrocarbons and the remainder non-aromatic hydrocarbons. The mixed feed is then contacted with liquid HF and cuprous fluoride, about 0.5 mole of cuprous fluoride being used per mole of aromatic hydrocarbon in the mixed feed. The acid phase from this contacting step then contains essentially all the $C_8$ aromatic hydrocarbons present in the mixed feed. In order to remove the close-boiling non-aromatic hydrocarbons dissolved in the acid phase, the acid phase is washed with isopentane in an amount of about one-half volume per volume of total hydrocarbon present in the acid phase.

Advantage is then taken of the fact that the xylene isomers are capable of displacing ethylbenzene from the ethylbenzene-cuprous fluoride complex. In this embodiment, the washed acid phase is passed into the extractor at an upper point and descends in intimate contact with a rising stream of xylene and isopentane; about 8 or 9 theoretical separation stages are provided in the contactor in order to obtain the desired purity ethylbenzene and xylene product. Sufficient xylene is introduced in this operation to theoretically displace all the ethylbenzene from this complex, i.e., 1 mole of xylene per mole of complexed ethylbenzene. In addition to the displacement xylene, reflux xylene is introduced into the extractor and a stream of liquid HF and CuF is introduced to compensate for the presence of the reflux xylene. The raffinate phase and acid phase are separated and withdrawn from the extractor and the further processing is in the manner set out in the illustrative embodiment in the figure. By this procedure, it is possible to begin with a mixed feed containing close-boiling non-aromatic hydrocarbons and produce pure aromatic hydrocarbons without decomposing the acid phase from the initial contacting zone prior to carrying out the operation shown in the figure.

This application is a continuation-in-part of Serial Number 573,251, filed March 22, 1956, now abandoned.

Other embodiments may be readily devised and these are intended to be included within the scope of the invention.

Thus having described the invention, what is claimed is:

1. An ethylbenzene recovery process which comprises contacting, under essentially anhydrous conditions, a hydrocarbon feed mixture containing ethylbenzene and at least one xylene as essentially the only aromatic hydrocarbons therein, in the substantial absence of olefinic hydrocarbons and organo-sulfur compounds, with liquid HF, in an amount of at least about 3 moles per mole of said aromatic hydrocarbons, and a fluoride from the class consisting of cuprous fluoride and cupric fluoride, at a pressure at least sufficient to keep HF in the liquid state, separating a raffinate phase, having an ethylbenzene-xylene mole ratio higher than said feed, from an acid phase comprising liquid HF and an HF-soluble complex containing said fluoride and aromatic hydrocarbons, the ethylbenzene-xylene mole ratio of aromatic hydrocarbons in said acid phase being less than in said feed, and wherein said fluoride usage is, in moles per mole of xylene in said feed, about that set out in the following schedule:

| Said fluoride: | Usage |
|---|---|
| Cuprous fluoride | 0.1–0.6 |
| Cupric fluoride | 0.2–1.2 |

2. The process of claim 1 wherein said cuprous fluoride usage is about 0.5 mole per mole of xylene in said feed.

3. The process of claim 1 wherein said cupric fluoride usage is about 1 mole per mole of xylene in said feed.

4. The process of claim 1 wherein said feed mixture consists of ethylbenzene, at least one xylene and paraffinic hydrocarbons which are readily separable from said aromatics by distillation and said contacting is at a temperature between about −20° C. and +80° C.

5. An ethylbenzene recovery process which comprises contacting, in a multi-stage operation, under essentially anhydrous conditions, a feed consisting of ethylbenzene, at least one xylene isomer and the remainder essentially paraffinic hydrocarbon readily separable by distillation from said aromatic hydrocarbons, with between about 6 and 30 moles of liquid HF per mole of aromatics in said feed, and a fluoride from the class consisting of cuprous fluoride and cupric fluoride, wherein when said fluoride is cuprous fluoride about 0.5 mole are used per mole of xylene in said feed and when said fluoride is cupric fluoride about 1.0 mole is used per mole of xylene in said feed, at a temperature between about −20° C. and +80° C. and at a pressure at least sufficient to keep HF in the liquid state, separating a raffinate phase containing a high purity ethylbenzene fraction with respect to said feed, from an acid phase containing HF, said fluoride and an aromatic hydrocarbon fraction which is high purity xylene, recovering from said raffinate phase a high purity ethylbenzene product and from said acid phase a high purity xylene product.

6. A separation process which comprises (1) contacting, in a multi-stage operation, utilizing at least about 6 separation stages, under essentially anhydrous conditions, a feed consisting of ethylbenzene, at least one xylene isomer and the remainder essentially paraffinic hydrocarbon readily separable by distillation from said aromatic hydrocarbons, with (a) between about 30 and 150 volume percent of liquid HF based on said feed and (b) 0.5 mole of cuprous fluoride per mole of xylenes in said feed, said contacting being carried out at a temperature between about 10° C. and 35° C. at a pressure at least sufficient to keep HF in the liquid state and wherein said contacting is carried out utilizing a reflux of xylene in an amount of between about 0.1 and 1 mole per mole of ethylbenzene in said feed and wherein about 0.5 mole of cuprous fluoride is present per mole of xylene reflux; (2) separating a raffinate phase from an acid phase, (3) removing HF and cuprous fluoride from said raffinate phase and distillatively recovering from said raffinate an ethylbenzene fraction containing at least about 95 mole percent of ethylbenzene, (4) distilling said acid phase which comprises liquid HF, cuprous fluoride and extract hydrocarbons at a temperature between about 20° C. and 125° C. at a pressure between about 1 mm. Hg and about 1 atmosphere, the lower pressures corresponding to the lower temperatures, until all the HF has been removed and (5) recovering hydrocarbons which have distilled along with the HF and remaining hydrocarbons in said distillation zone and distilling therefrom a xylene fraction containing at least about 95 mole percent of xylenes.

7. An ethylbenzene-xylene separation process which comprises contacting a hydrocarbon feed mixture containing ethylbenzene and at least one xylene as essentially the only aromatic hydrocarbons therein, in the substantial absence of olefinic hydrocarbons and organo-sulfur compounds, with at least about 3 moles of liquid HF per mole of said aromatic hydrocarbons and a fluoride from the class consisting of cuprous fluoride and cupric fluoride, thereby forming a liquid HF phase containing dissolved complexes of said fluoride and aromatic hydrocarbons, wherein the usage of said fluoride is, in mole per mole of xylene in said feed, about that set out in the following schedule:

| Said fluoride: | Usage |
|---|---|
| Cuprous fluoride | 0.3–0.6 |
| Cupric fluoride | 0.6–1.2 | maintaining said liquid HF phase and non-complexed hydrocarbons at a temperature sufficient to vaporize HF and non-complexed hydrocarbons but below that resulting in appreciable formation of side-reaction products, withdrawing overhead a vapor stream of HF and hydrocarbons while maintaining a liquid HF phase in the vaporization zone, condensing said hydrocarbon vapors to obtain a fraction enriched in ethylbenzene, with respect to said feed.

8. The process of claim 7 wherein said feed consists of ethylbenzene and at least one xylene isomer and said vaporization zone is maintained at a temperature below about 150° C.

9. The process of claim 8 wherein said vaporization zone is maintained at a temperature between about 100° and 120° C.

10. The process of claim 7 wherein said feed consists of ethylbenzene, xylene and a minor amount of non-aromatic hydrocarbons and said vaporization zone is maintained at a temperature between about 50° and 80° C.

No references cited.